(12) United States Patent
Iida et al.

(10) Patent No.: US 7,477,821 B2
(45) Date of Patent: Jan. 13, 2009

(54) SEALING COMPOSITION AND PRODUCTION METHOD OF OPTICAL FIBER HAVING AIR HOLES IN THE INSIDE USING THE COMPOSITION

(75) Inventors: Takafumi Iida, Hyogo (JP); Masayoshi Hachiwaka, Hyogo (JP)

(73) Assignees: Nagase Chemtex Corporation, Osaka (JP); Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 11/666,070

(22) PCT Filed: Oct. 6, 2005

(86) PCT No.: PCT/JP2005/018513

§ 371 (c)(1),
(2), (4) Date: Sep. 28, 2007

(87) PCT Pub. No.: WO2006/046391

PCT Pub. Date: May 4, 2006

(65) Prior Publication Data
US 2008/0056655 A1 Mar. 6, 2008

(30) Foreign Application Priority Data
Oct. 25, 2004 (JP) ............................. 2004-310141

(51) Int. Cl.
*G02B 6/02* (2006.01)
(52) U.S. Cl. ...................... 385/125; 385/123; 385/147
(58) Field of Classification Search ................. 385/123, 385/125, 147
See application file for complete search history.

(56) References Cited

U.S. PATENT DOCUMENTS
6,319,603 B1 * 11/2001 Komiya et al. .............. 428/378

FOREIGN PATENT DOCUMENTS

| EP | 0 239 351 A2 | 9/1987 |
|---|---|---|
| EP | 1 510 841 A1 | 3/2005 |
| JP | 11-133207 | 5/1999 |
| JP | 2002-323625 | 11/2002 |
| JP | 2003-202431 | 7/2003 |
| JP | 2004-004324 | 1/2004 |
| JP | 2004-133277 | 4/2004 |
| JP | 2004-246068 | 9/2004 |
| JP | 2004-279516 | 10/2004 |

* cited by examiner

*Primary Examiner*—Jennifer Doan
(74) *Attorney, Agent, or Firm*—Edwards Angell Palmer & Dodge LLP

(57) ABSTRACT

A sealing composition for a photonic crystal fiber which comprises a compound represented by the following general formula (I), a compound represented by the following general formula (II) and a photo-polymerization initiator: $Tf1\text{-}(O)_a\text{-}(CH_2)_b\text{-}(CF_2)_m\text{-}(CH_2)_b\text{-}(O)_a\text{-}Tf1$ (I) $Tf2\text{-}(O)_a\text{-}(CH_2)_b\text{-}(CF_2)_m\text{-}(CH_2)_b\text{-}(O)_a\text{-}Tf2$ (II) wherein a represents 0 or 1, b represents 0 or 1, m represents an integer of 4 to 12, Tf1 represents a glycidyl group, and Tf2 represents $CH_2\!=\!CH\!-\!C(O)\!-\!$; and a method for producing an optical fiber comprising filling air holes with above sealing composition and polishing and end surface; and an optical fiber having air holes in the inside which is produced by the method. The above sealing composition can achieve a low refractive index, and also is excellent in the low viscosity and heat resistance, and exhibits good filling characteristics and good polishing processability.

13 Claims, No Drawings

SEALING COMPOSITION AND PRODUCTION METHOD OF OPTICAL FIBER HAVING AIR HOLES IN THE INSIDE USING THE COMPOSITION

CROSS-REFERENCE TO PRIOR APPLICATIONS

This application is a 35 USC § 371 national phase filing of international application number PCT/JP2005/018513, which was filed on 6 Oct. 2005, and which claims priority to Japanese Patent Application Serial No. 2004-310141 which was filed on 25 Oct. 2004, both of which are incorporated by reference.

TECHNICAL FIELD

The present invention relates to a sealing composition for filling air holes of an optical fiber such as a photonic crystal fiber having the air holes in the inside and more particularly to a sealing composition containing a fluorine compound of specified structure with an acrylic group and a fluorine compound of specified structure with an epoxide group, a production method of an optical fiber having air holes in the inside using the composition, and an optical fiber having air holes in the inside.

BACKGROUND ART

Optical fibers have been used in a wide sphere for optical communication, optical measurements and the like. For example, the optical communication tends to be used widely for broad band or LAN optical communication networks, photonic application in automotives, control of electric products and industrial appliances and the like. However, to construct optical communication networks with further increased capacity, long distance and highly functional operation, it is pointed out that conventional optical fibers forming waveguides called as cores by adding additives to quartz-based glass are limited in terms of optical properties. To deal with this issue, in these years, an optical fiber with a new structure having many air holes in its cross-section has drawn attention.

An optical fiber is generally composed of a core forming the center part where light is passed and a cladding forming the periphery of the core. The above-mentioned optical fiber with a new structure has a plurality of tubular air holes extended along the axial direction of the optical fiber in the core and/or the cladding and in the case where the optical fiber is cut, many air holes appear in the cross-section. As such the optical fiber, there are those having regularly arranged air holes in the cross section and those having irregularly arranged air holes. There are also those called as a holey fiber and as a photonic band gap fiber. Further, there exist those called as photonic crystal fiber. The name of the above-mentioned optical fiber with a new structure is not necessarily standardized, so that several names are used in multiple in some cases. Some of the names are, for example, index guiding photonic crystal fiber, air-clad fiber, hole-assisted fiber, photonic band gap fiber and the like, and although different in the air hole arrangement in the cross-sections, all of these fibers are called as a photonic crystal fiber. The photonic crystal fiber has regular arrangement of the air holes in the cross-section.

In this specification, it should be understood that the optical fiber having air holes in the inside, as described above for the optical fiber with a new structure, includes all kinds of optical fibers having a plurality of tubular air holes extended along the axial direction of the optical fibers in the core and/or the cladding and having a structure in which many air holes appear in the cross-sections in the case where the optical fibers are cut, and accordingly there are optical fibers with air holes arranged regularly in the cross-sections and optical fibers with air holes arranged irregularly in the cross-sections. It is pointed out that the optical fiber having air holes in the inside, particularly, the photonic crystal fiber, has the following characteristics which conventional optical fibers do not have: that is, the fiber makes possible a single mode at optional wavelength; has a high refractive index and flexural strength; has a large numerical apertures; and can be designed to have a refractive index and polarization characteristics as desired since the average refractive index is changed on the basis of the size and arrangement of the air holes.

However, in the case of attaching a connector for connecting the optical fiber having air holes in the inside, it is required to polish the end face of the fiber to make the surface flat, and if the polishing abrasive grains, polishing dust or the like enter the air holes at the time of polishing, not only the optical characteristics of the optical fiber are deteriorated, but also the polishing dust or the like is sometimes blown out of the air holes during its use to deteriorate the transmission property. With respect to a mechanical splice, in the case of directly butting and connecting the end faces of fibers after the fibers are cut, a refractive index matching agent (also working as an adhesive) is applied to the end faces and it is also required to avoid penetration of the refracting index matching agent into the air holes. Additionally, in the case of cutting the fibers, unlike conventional optical fibers, since the optical fiber has air holes, cracks may be formed from the air holes at the time of cutting. As described above, the optical fiber having air holes in the inside has a particular problem of the end face treatment which does not occur in the case of conventional optical fibers.

Since air holes are generally arranged in the cladding, a sealing composition for the air holes in an end portion is required to be an optical resin satisfying the following to give needed characteristics to the optical fiber: that the sealing composition has a lower refractive index than that of the core; the chargeability of the sealing composition in the air holes is high; the sealing composition is heat resistant in consideration of heat generation at the time of polishing; the polishing processability in the end face is good. Examples of the optical resin are a photo-polymerizable composition containing a specified epoxy-based fluorine compound (e.g. reference to Patent Document 1), a photo-polymerizable composition containing a specified acrylate-based fluorine compound (e.g. reference to Patent Document 2 and Patent Document 3). However, these compositions generally have a refractive index of 1.45 or higher and thus the refractive index is not low.

On the other hand, as the optical resin containing a fluorine compound having an acryl or epoxide group, there is, for example, an optical thin film using a cured substance of an epoxy compound having a fluorine-containing alkylene group (e.g. reference to Patent Document 4). This technique aims to improve the optical coating and although there is description that an optical thin film excellent in scratching resistance can be formed, the technique mainly relates to applications for reflection prevention films and is nothing to do with the sealing composition.

As described above, the connection issue, which is a characteristic problem of the optical fiber having air holes in the inside, does not exist in the case of conventional optical fibers. And since a technique of butting polished end faces of optical fibers and fixing the fibers in a connector is employed but not a technique of simply sticking a fiber and a connector with an adhesive, the problem is relevant to the end face treatment. To solve the problem, it is required to satisfy low viscosity, heat resistance, chargeability, polishing processability, and adhesion strength all in high levels beyond the minimum necessary levels, and sealing compositions which are satisfactory in these properties have not been made available yet.

Patent Document 1: Japanese Patent Application Laid-Open (JP-A) No. 2000-154233
Patent Document 2: JP-A No. 62-265248
Patent Document 3: JP-A No. 63-101409
Patent Document 4: JP-A No. 11-133207

DISCLOSURE OF THE INVENTION

Problems to Be Solved by the Invention

In view of the above state of the art, it is an aim of the present invention to provide an air hole sealing composition capable of giving a low refractive index and excellent in low viscosity, heat resistance, chargeability, polishing processability, and adhesion strength, a production method of an optical fiber having air holes in the inside using the sealing composition, and the optical fiber having air holes in the inside.

Means for Solving the Problems

Inventors of the present invention have made extensive investigations to solve the above-mentioned problem and consequently have found that it possible to accomplish the above-mentioned aim by using a fluorine compound of specified structure with an acrylic group and a fluorine compound of specified structure with an epoxide group in combination and consequently have completed the present invention. That is, the present invention provides a sealing composition comprising a compound defined by the following general formula (I), a compound defined by the following general formula (II) and a photo-polymerization initiator and usable to seal air holes of an optical fiber having the air holes in the inside.

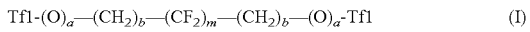

Tf1-(O)$_a$—(CH$_2$)$_b$—(CF$_2$)$_m$—(CH$_2$)$_b$—(O)$_a$-Tf1     (I)

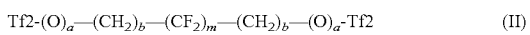

Tf2-(O)$_a$—(CH$_2$)$_b$—(CF$_2$)$_m$—(CH$_2$)$_b$—(O)$_a$-Tf2     (II)

In the formulas (I) and (II), the respective reference characters a denote identically 0 or 1; the respective reference characters b denote identically 0 or 1; m denotes an integer of 4 to 12; Tf1 denotes a glycidyl group; and Tf2 denotes $CH_2$=CH—C(O)—.

The present invention also provides a sealing method comprising the steps of: filling air holes in an end portion of an optical fiber having the air holes in the inside with the above-mentioned sealing composition; and radiating ultraviolet rays to the filled sealing composition to seal the air holes of an optical fiber having the air holes in the inside with the above-mentioned sealing composition.

The present invention also provides a production method of an optical fiber polished in the end face and having air holes in the inside which comprised the steps of: filling air holes in an end portion of an optical fiber having the air holes in the inside with the above-mentioned sealing composition; radiating ultraviolet rays to the filled sealing composition; and polishing the end face after the ultraviolet ray radiation step.

In the above-mentioned sealing method and production method, thermal curing treatment may be further added, preferably after the ultraviolet ray radiation step.

The present invention also provides an optical fiber having air holes in the inside in which the air holes are filled with the above-mentioned sealing composition to seal a part of each of the air holes in the longitudinal direction coincident with the axial direction of the optical fiber.

Effects of the Invention

The present invention satisfies low viscosity, heat resistance, chargeability, polishing processability, and adhesion strength all in high levels beyond the minimum necessary levels as follows.

(1) Owing to the above-mentioned configuration, the sealing composition of the present invention can give a low refractive index and is excellent in low viscosity and heat resistance.

(2) Owing to the above-mentioned configuration, the sealing composition of the present invention can give a low refractive index (D-line refractive index, denoted as $n_D$ in this specification) measured at 25° C. in a liquid state before curing in a range from 1.34 to 1.41 and keep the low refractive index even after curing.

(3) Owing to the above-mentioned configuration, the sealing composition of the present invention gives a cured substance having a Tg in a range from 80 to 110° C. and is excellent in heat resistance and polishing processability.

(4) Owing to the above-mentioned configuration, the sealing composition of the present invention has a viscosity at 25° C. in a range from 10 to 500 mPa·s and is excellent in chargeability.

(5) Owing to the above-mentioned configuration, the sealing composition of the present invention gives an adhesion strength of 4.0 N/mm$^2$ or higher and is excellent in filling processability.

(6) Owing to the above-mentioned configuration, the sealing method of the present invention is capable of sealing air holes of an optical fiber having the air holes in the inside while keeping the refractive index lower than that in a core and retaining heat resistance and polishing processability.

(7) Owing to the above-mentioned configuration, the production method of the present invention is capable of obtaining an optical fiber having air holes in the inside in which the air holes in the end portion are filled with the sealing composition and the end face is polished while being prevented from penetration of foreign substances such as polishing dust into the air holes.

(8) Owing to the above-mentioned configuration, the optical fiber of the present invention is an optical fiber having air holes in the inside in which the air holes in the end portion are filled with the sealing composition and the end face is polished while being prevented from penetration of foreign substances such as polishing dust into the air holes.

Hereinafter, the present invention will be described more in detail.

BEST MODE FOR CARRYING OUT THE INVENTION

A sealing composition of the present invention comprises a compound defined by the above-mentioned general formula (I), a compound defined by the above-mentioned general formula (II), and a photo-polymerization initiator. In the general formulas (I) and (II), the respective reference characters a denote identically 0 or 1. The respective reference characters b denote identically 0 or 1. Among the compounds are those in which a is 0 and 1 and in the respective cases, there also exist those in which b is 0 and 1. Additionally, it is no need to say that the reference characters a, b, m in the general formula (I) and the reference characters a, b, m in the general formula (II) are respectively independent of each other.

Practical examples of a compound defined by the above-mentioned general formula (I) may include those having the following structure excluding Tf1 at both ends: —$(CF_2)_m$—; —$(CH_2)$—$(CF_2)_m$—$(CH_2)$—; O—$(CF_2)_m$—O—; and O—$(CH_2)$—$(CF_2)_m$—$(CH_2)$—O—. The reference character m denotes an integer of 4 to 12 and preferably an integer of 6 to 10.

Practical examples of a compound defined by the above-mentioned general formula (II) may include those having the following structure excluding Tf2 at both ends: —$(CF_2)_m$—; —$(CH_2)$—$(CF_2)_m$—$(CH_2)$—; O—$(CF_2)_m$—O—; and O—$(CH_2)$—$(CF_2)_m$—$(CH_2)$—O—. The reference character m denotes an integer of 4 to 12 and preferably an integer of 6 to 10.

Among these compounds, those in which a is 1 are preferable in terms of the polymerization ratio. The sealing composition of the present invention may contain one kind of the compounds alone or two or more kinds of these compounds in combination.

The mixing ratio by weight of the compound defined by the above-mentioned general formula (I) and the compound defined by the above-mentioned general formula (II) is preferable in a range from (5/95) to (95/5)=(the compound defined by the above-mentioned general formula (I))/(the compound defined by the above-mentioned general formula (II)) in terms of the balance among polishing processability, adhesion strength, and heat resistance.

The sealing composition of the present invention may further contain, if necessary, at least one kind of compounds defined by the following general formula (III) in place of a portion of the compound defined by the above-mentioned general formula (I) and/or the compound defined by the above-mentioned general formula (II).

Tf3-$(O)_c$—$(CH_2)_d$—$(CF_2)_n$-A    (III)

In the general formula (III), the reference character c denotes 0 or 1; the reference character d denotes an integer of 0 to 2; n denotes an integer of 1 to 11; Tf3 denotes a glycidyl group or $CH_2$=CH—C(O)—; and A denotes H or F.

Examples of the compound defined by the above-mentioned general formula (III) are 2,2,2-trifluoroethyl (meth) acrylate, 2,2,3,3-tetrafluoropropyl acrylate, 1H,1H,5H-octafluoropentyl(meth)acrylate, heptadecafluorodecyl acrylate, 3-(1H,1H,9H-hexadecafluorononyl)-1,2-epoxypropane, 3-(perfluorooctyl)-1,2-epoxypropane. These compounds may be used alone or two or more of them may be used in combination.

In the case of using it in place of the compound defined by the above-mentioned general formula (I), the compound defined by the above-mentioned general formula (III) is preferably those having a glycidyl group and in the case of using it in place of the compound defined by the above-mentioned general formula (II), the compound defined by the above-mentioned general formula (III) is preferably those having $CH_2$=CH—C(O)—.

The mixing amount of the compound defined by the above-mentioned general formula (III) is preferably less than 50 parts by weight to 100 parts by weight of the total of the compound defined by the above-mentioned general formula (I), the compound defined by the above-mentioned general formula (II), and the compound defined by the above-mentioned general formula (III) in terms of the photo-polymerizability and heat resistance of the composition. It is more preferably less than 35 parts by weight.

A production method of the compound defined by the general formula (I) and the compound defined by the general formula (II) may be carried out, for example, by causing reaction of a di- or mono-alcohol having a perfluoro group with a halogenated epoxypropyl, in the case of compounds having an epoxide group at the terminal Tf; or may be carried out by causing reaction of a di- or mono-alcohol having a perfluoro group with a halogenated aryl and then oxidizing the reaction product with a peracid such as performic acid, peracetic acid, perpropiocic acid. In the case of compound having $CH_2$=CH—C(O)— for Tf, esterification reaction of a di- or mono-alcohol having perfluoro group with acrylic acid may be carried out.

A photo-polymerization initiator to be used in the sealing composition of the present invention contains a photo-radical polymerization initiator and a photo-cationic polymerization initiator in combination in terms of the curability. Examples of the photo-radical polymerization initiator are acetophenones, aminoacetophenones, benzophenones, Michler's ketones, benzyls, benzoins, benzoin ethers, benzyldimethyl ketals, and thioxanthones. Examples of the photo-cationic polymerization initiator are diazonium salts, sulfonium salts, and iodonium salts. Practical examples of the photo-radical polymerization initiator are 1-hydroxy-cyclohexyl phenyl ketone, 2,2-dimethoxy-2-phenylacetophenone, benzophenone, benzoin isobutyl ether, 2-hydroxy-2-methyl-1-phenyl-propane, α,α-dimethoxy-α-hydroxy-acetophenone, 1-[4-(2-hydroxyethoxy)phenyl]-2-hydroxy-2-methylpropan-1-one, α-hydroxyisobutylphenone, and 2,4,6-trimethylbenzoyl-diphenylphosphine oxide; and practical examples of the photo-cationic polymerization initiator are benzenediazonium hexafluoroantimonate, benzenediazonium hexafluorophosphate, benzenediazonium hexafluoroborate, aromatic diazonium salts, diallyliodonium salts, triallysulfonium salts, triallylselenium salts, triallylpyrylium salts, benzylpyridium thiocyanate, dialkylphenacylsulfonium salts, dialkylhydroxyphenylsulfonium salts, and metallocene compounds. These photo-radical polymerization initiators and photo-cationic polymerization initiators may be used respectively alone and two or more of them may be used in combination. Additionally, in the case of sulfonium salts, no sufficient hardness can be obtained only by UV radiation in some cases. On the other hand, in the case of iodonium salts, quick curing is made possible by using the salts alone or in combination with a sensitizer and sufficient hardness can be obtained only by UV radiation.

The addition amount of the photo-polymerization initiator is preferably 1 to 10 parts by weight and particularly preferably 0.5 to 5 parts by weight to 100 parts by weight of the photo-polymerizable compounds in the composition.

Further, if necessary, the following compounds may be used as a sensitizer: for example, anthracene, 9,10-dimethoxyanthracene, 9,10-dipropoxyanthracene, 9,10-dibutoxyanthracene, 2-ethyl-9,10-dimethoxyanthracene, 2-ethyl-9,10-dibutoxyanthracene, and 2-ethyl-9,10-dipropoxyanthracene.

The addition amount of these sensitizers is preferably 1 to 200 parts by weight and particularly preferably 10 to 100 parts by weight to 100 parts by weight of the photo-polymerization initiator.

The sealing composition of the present invention may contain other additives to an extent that the purpose of the present invention is not interfered. Such additives may include a silane coupling agent, a leveling agent, and a defoaming agent. Particularly, addition of a silane coupling agent is effective to improve the conformability to an inorganic optical fiber. Examples of the silane coupling agent are γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, vinyltrimethoxysilane, and vinyltriethoxysilane. These other components may be used particularly to an extent that the respective characteristics such as the following refractive index, Tg, and viscosity are not interfered.

The mixing amount of above-mentioned other additives is preferably 10 parts by weight or less and more preferably 5 parts by weight or less in 100 parts by weight of the sealing composition of the present invention.

In the sealing composition of the present invention, it is required to make the refractive index ($n_D$) at 25° C. of the cured substance after polymerization lower than the refractive index of the core. In the case where the refractive index is higher than that of the core, the effect to confine light is eliminated and light leaks toward the sealing composition with the high refractive index. Since the refractive index ($n_D$) of quartz to be used for the core is 1.452, the refractive index of the sealing composition after polymerization has to be lower than 1.452. Further, it is known that the refractive index of a cured substance after polymerization is generally increased more than the refractive index in a liquid state by about 0.025. From a viewpoint of that, the refractive index ($n_D$) measured at 25° C. in the liquid state before curing is preferably in a range from 1.34 to 1.41. The lower limit of the refractive index is not particularly defined, however it is technically difficult to achieve a refractive index lower than 1.34 in terms of the balance with polymerizability. The refractive index is more preferably in a range from 1.35 to 1.40.

In the sealing composition of the present invention, addition of the above-mentioned silane coupling agent is effective to increase the refractive index. On the contrary, addition of the above-mentioned compound defined by the general formula (III) is effective to decrease the refractive index. Accordingly, it is made possible to adjust the refractive index of the sealing composition of the present invention in the above-mentioned range by properly using these components.

The sealing composition of the present invention is preferable to have a Tg in form of a cured substance in a range from 80 to 110° C. If Tg is lower than 80° C., the end face is almost melted at the time of polishing and the cross-sectional face becomes like a torn face but not a cleaved face when it is cut and accordingly evenness of the end face is impaired and further, fibers cannot be connected to each other in the case of connecting. Since the intervals between neighboring fibers are widened due to the existence of the torn resin, the light reflection occurs in such portions. On the other hand, if Tg exceeds 110° C., the hardness becomes so high that cracking occurs in the air holes at the time of cutting. Tg is more preferably in a range from 80 to 100° C.

The sealing composition of the present invention is preferable to have a viscosity at 25° C. not lower than 10 mPa·s and not higher than 500 mPa·s. If the viscosity is too lower than this range, when the fiber is laid transversely at the time of ultraviolet radiation, the sealing composition may flow out or it becomes difficult to control the length to be filled with the sealing composition. On the contrary, if the viscosity is too high, it takes a very long time to fill the air holes with the sealing composition. For example, in the case of using a fiber with a diameter of 125 µm (air hole diameter of 4.6 µm), if the viscosity at 25° C. is 2500 mPa·s, it takes 1 hour or longer to fill 5 mm of the fiber. The upper limit is more preferably 200 mPa·s or lower, furthermore preferably 100 mPa·s or lower, and even more preferably 50 mPa·s or lower.

The sealing composition of the present invention is preferable to have adhesion strength of 4.0 N/mm² or higher after ultraviolet radiation at 6 J/cm² intensity and thermal curing treatment at 80° C. for 1 hour. If the adhesion strength is low, the sealing composition is separated at the time of polishing and the sealing composition is squeezed by the polishing dust entering the air holes. Further, if the adhesion strength is lower than the shear force at the time of cutting, the sealing composition comes out of the air holes. From a viewpoint of that, the adhesion strength is preferably in the above-mentioned range and more preferably 5.0 N/mm² or higher.

The production method of the sealing composition of the present invention is not particularly limited and may involve a step of mixing raw materials evenly. For example, an epoxy compound of the general formula (I), an acrylate compound of the general formula (II), an epoxy compound or acrylate compound of the general formula (III), a photo-polymerization initiator, a coupling agent, or other needed components are added and mixed, and further stirred and mixed under a condition of heating and reduced pressure by a conventional method, and then subjected to defoaming treatment. The stirring and mixing is carried out in conditions of 40 to 80° C., reduced pressure of 1 to 20 torr, for a duration from 30 minutes to 2 hours.

The sealing composition of the present invention is preferably cured by UV radiation. The acrylate compound of the general formula (II) and the acrylate compound of the general formula (III) are excellent in the polymerizability and sufficiently curable even by radiation at lower than 6.0 J/cm² intensity. The epoxy compound of the general formula (I) and the epoxy compound of the general formula (III) are excellent in the polymerizability and sufficiently curable even by radiation at the intensity of 6.0 J/cm². Of course, in the case of epoxy compounds, the curability is further increased by combination of thermal curing treatment thereafter, so that, if necessary, thermal curing treatment at about 80° C. for 1 hour may be carried out in combination.

With respect to the sealing composition of the present invention, the respective components have good compatibility to one another and exhibit catalytic function of the epoxy-based compound components by the photo-radical polymerization initiator components for the acrylic-based compounds and quick curability is expected. Accordingly, combination use of both compounds causes a synergetic effect and also draws the heat resistance of an epoxy resin and the adhesive property of an acrylic resin. At the same time, the hardness of the epoxy resin is moderated by the softness of the acrylic resin and moreover, it is made possible to adjust the refractive index to be low.

An optical fiber having air holes in the inside for which the sealing composition of the present invention is employed is not particularly limited, and the sealing composition is employed preferably for a photonic crystal fiber. In this specification, it should be understood that, as described above, the photonic crystal fiber include both a fiber having no air hole in the core and a fiber having air holes in the core, for example, so-called a photonic band gap fiber.

The method of sealing the air holes of the present invention comprises the steps of: filling the air holes in the end portion of the optical fiber having air holes in the inside; radiating ultraviolet rays to the filled sealing composition; and if necessary, thermally curing the sealing composition. The above-mentioned sealing method can be employed preferably for the optical fiber production method of the present invention, which will be described in detail hereinafter.

The production method of an optical fiber polished in the end face and having air holes in the inside according to the present invention is a method comprising the steps of: filling the air holes in the end portion of the optical fiber having air holes in the inside with the above-mentioned sealing composition; radiating ultraviolet rays to the filled sealing composition; if necessary, thermally curing the sealing composition;

and polishing the end face after the ultraviolet radiation step and the thermal curing step if the curing is carried out. In the step of filling the air holes in the end face of the optical fiber having air holes in the inside with the sealing composition, the sealing composition may be introduced into the air holes to an extent, for example, about several mm to ten and several mm from the end face using capillary phenomenon since the diameter of the air holes is in µm order. The filling step may be carried out, for example, in about 10 seconds and thus the work efficiency is high. Next, in the step of radiating ultraviolet rays to the filled sealing composition, ultraviolet may be radiated, for example, at radiation energy of about 50 mW/cm$^2$ for about 60 seconds using a UV lamp or the like. Thereafter, if necessary, thermal curing treatment at about 80° C. for 1 hour is carried out and the end face is polished to make the surface flat to produce the optical fiber having air holes in the inside and whose end face is polished while the penetration of foreign substances into the air holes is prevented.

The optical fiber having air holes in the inside of the present invention has the above-mentioned air holes filled with the sealing composition and a part of each of the air holes are sealed in the longitudinal direction coincident with the axial direction of the optical fiber. The optical fiber is preferably produced by the above-mentioned production method. In the optical fiber produced in such a manner, although the air holes are filled with the sealing composition in the end portion, the core has a higher refractive index than that of the sealing composition and therefore, even if the air holes in the cladding are sealed, light can be confined in the core and the core can work as a waveguide for light. Accordingly, it is made possible to closely and air-tightly stick end faces and also connect waveguides for light by butting and fixing end faces of optical fibers in which the end faces are sealed with the above-mentioned sealing composition and polished; end faces of the optical fiber having air holes in the inside and a conventional optical fiber; and end faces of the optical fiber and a connector ferrule, and consequently, good connection free from light leakage in the connection part can be accomplished.

The connection method of optical fibers, or an optical fiber and an optical connector may be proper and applicable connection methods, and, for example, fusion, butting and fixing, and adhesive means applicable for the methods may be employed.

Hereinafter, the present invention will be described more in detail with reference to Examples, however it is not intended that the present invention should be limited to the illustrated Examples.

EXAMPLES 1 TO 3 AND COMPARATIVE EXAMPLES 1 TO 3

The sealing compositions were prepared by mixing the respective components in the amounts (part by weight) shown in Table 1 in a conventional manner.

The abbreviations for the components shown in Table 1 are as follows.

FA-16: an acrylate compound (an acrylate compound defined by the general formula (II) in which a=1; b=1, and m=8) manufactured by Kyoeisha Chemical Co., Ltd.)

ART-3: a fluorine group-containing monofunctional acrylate compound manufactured by Kyoeisha Chemical Co., Ltd.)

H022: an epoxy compound (an epoxy compound defined by the general formula (I) in which a=0; b=0, and m=4) manufactured by Tosoh F-Tech Inc.)

H010: an epoxy compound (an epoxy compound defined by the general formula (III) in which c=0; d=0, n=8, and A=F) manufactured by Tosoh F-Tech Inc.)

IC651: Irgacure 651 (trade name), a radical-polymerization initiator manufactured by Ciba Specialty Chemicals Inc.

IC184: Irgacure 184 (trade name), a radical-polymerization initiator manufactured by Ciba Specialty Chemicals Inc.

A2074: PHOTOINITIATOR 2074 (trade name), a cationic polymerization initiator manufactured by Rhodia Japan Ltd.

Evaluation Methods

Viscosity: a liquid-phase sealing composition adjusted at 25° C. was rotated at 5 rpm by an E type (L type) rotary viscometer to measure the viscosity (unit: mPa·s)

Refractive index: Using a digital refractive index meter RX-5000 manufactured by Atago Co., Ltd., D-line (589 nm) of sodium was employed to measure the refractive index at 25° C.

Tg: Using DMS manufactured by Seiko Instruments Inc., a test specimen with a thickness of 100 µm was employed and Tan δ peak value measured in sliding mode was defined as Tg.

Adhesion strength: a sealing composition was applied in a thickness of about 20 µm to an alkali glass plates and two glass plates were butted and subjected to UV irradiation at 50 mW/cm$^2$ intensity by a UV lamp for 60 seconds and then heated at 80° C. for 1 hour. After that the tensile shear strength (N/mm$^2$) of both plates was measured using a tensile tester.

Filling time: Photonic crystal fibers having air hole diameter of 4.6 µm and 1.2 µm and vertically cut in end faces were immersed in a sealing composition and performance of the filling of the air holes by capillary phenomenon was observed, and the filling time until the filling was promoted to a distance of 10 mm was measured. If the filling time was within 10 seconds, ⊙ was marked; if within 60 seconds, ○ was marked; and if 1 hour or longer, × was marked.

Filling state: a sealing composition was filled in a photonic crystal fiber and UV-cured. The fiber was cut while leaving about 2 mm of the filled part and filling state in the cross-section face was observed with an optical microscope. In the case where neither separation nor deformation of the sealing composition was observed, ⊙ was marked; if there slightly existed gaps in the interface to the air holes, ○ was marked; and if the cutting was not even or the cutting face was just like torn state, × was marked.

Processability: after being attached with an optical connector ferrule, a photonic crystal fiber in which the air holes were filled with a sealing composition was polished and then the state of the sealing composition in the air holes in the polished end face was observed with an optical microscope for evaluation. In the case where a good plane was formed in the filled air hole, ⊙ was marked and if the plane is uneven, × was marked.

Extent of abrasion: Extent of abrasion of a sealing composition in the air holes of a fiber part to a ferrule was measured in accordance with interference pattern of the end face (unit: µm) The numerical evaluation was carried out as follows: in the case from +0.1 to −0.05 µm, ⊙ was marked and in the case lower than −0.05µ, × was marked.

Optical/Insertion loss: Using a photonic crystal fiber with an air hole diameter of 9.3 µm and having air holes filled with a sealing composition to about 5 mm distance, the insertion loss method (B) and insertion loss method (C) were carried out according to JIS C 5961 Optical Connector Testing Method in paragraph 6.1 (unit: dB). The qualified standards (regulation) are 0.5 dB or lower for the insertion loss method (B) and 1.0 dB or lower for the insertion loss method (C).

TABLE 1

|  | Example | | | Comparative Example | | |
|---|---|---|---|---|---|---|
|  | 1 | 2 | 3 | 1 | 2 | 3 |
| FA-16 | 75 | 35 | 20 | 100 | — | 70 |
| ART-3 | — | — | — | — | — | 30 |
| H010 | — | 30 | 30 | — | — | — |
| H022 | 25 | 35 | 50 | — | 100 | — |
| IC651 | 2 | — | — | 2 | — | 2 |
| IC184 | — | 1 | 1 | — | — | — |
| A2074 | 1 | 1 | 1 | — | 2 | — |
| Viscosity (25° C.) (mPa·s) | 35 | 25 | 25 | 40 | 25 | 35 |
| Refractive index (nD) (25° C.) | 1.38 | 1.36 | 1.37 | 1.38 | 1.36 | 1.38 |
| Tg (° C.) | 84 | 90 | 98 | 86 | 67 | 60 |
| Adhesion strength N/mm² | 5.1 | 6.3 | 6.3 | 3.8 | 2.8 | 2.5 |
| Filling time | ○ | ◉ | ◉ | ○ | ◉ | ○ |
| Filling state | ○ | ◉ | ◉ | ○ | X | X |
| processability | ◉ | ◉ | ◉ | ◉ | ◉ | ◉ |
| Extent of abrasion (μm) | −0.04 | −0.03 | −0.03 | −0.07 | −0.02 | −0.05 |
|  | ◉ | ◉ | ◉ | X | ◉ | ◉ |
| Insertion loss method (B) (dB) | 0.3 | 0.1 | 0.3 | 0.3 | 0.3 | 0.3 |
| Insertion loss method (C) (dB) | 0.5 | 0.2 | 0.4 | 0.5 | 0.5 | 0.5 |

From the results of Examples 1 to 3, it is found that the sealing compositions of the present invention not only had low viscosity, low refractive index, proper Tg, and excellent curability but also were particularly excellent in the adhesion strength and showed well balanced and excellent properties in the processability, extent of abrasion, and optical/insertion loss. On the other hand, Comparative Example 1, which is an acrylic resin composition, showed high extent of abrasion; Comparative Example 2, which is an epoxy resin, showed a low Tg, poor heat resistance and insufficient filling property; and Comparative Example 3, which is an acrylic resin, showed a low Tg, poor heat resistance and insufficient filling property. Although having low viscosity, all of Comparative Examples could not be used as a sealing composition.

As described above, the viscosity of a conventionally employed acrylic-based adhesive composition is typically about 2500 mPa·s; Tg is, for example, about 56° C.; the adhesion strength is almost same as that of Comparative Examples and particularly a high viscosity has been a problem. However, in general, it has been difficult to reliably keep well balanced properties since the adhesion strength or the like is deteriorated if the viscosity is decreased. To deal with the problem, as described above, the compositions of the present invention are found sufficiently satisfying all of the needed characteristics.

INDUSTRIAL APPLICABILITY

A sealing composition of the present invention can be adjustable to low refractive index and satisfies the respective functional characteristics such as low viscosity, heat resistance, and adhesion strength, so that the sealing composition can make end face treatment of an optical fiber having air holes in the inside such as a photonic crystal fiber possible. Accordingly, the sealing composition provides an indispensable technique for constructing optical communication networks with increased capacity, prolonged distance, and improved functionality and is thus very useful for establishing optical communication networks.

The invention claimed is:

1. A sealing composition comprising a compound defined by the following general formula (I), a compound defined by the following general formula (II) and a photo-polymerization initiator and usable to seal air holes of an optical fiber having air holes in the inside:

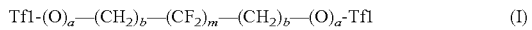

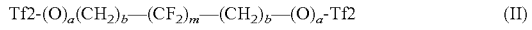

wherein in the formulas (I) and (II), the respective reference characters a denote identically 0 or 1; the respective reference characters b denote identically 0 or 1; m denotes an integer of 4 to 12; Tf1 denotes a glycidyl group; and Tf2 denotes $CH_2=CH—C(O)—$, and wherein the optical fiber having air holes in the inside is a photonic crystal fiber.

2. The sealing composition according to claim 1, wherein the mixing ratio by weight of the compound defined by the general formula (I) and the compound defined by the general formula (II): the compound defined by the general formula (I)/the compound defined by the general formula (II) is in a range from 5/95 to 95/5.

3. The sealing composition according to claim 2, further comprising a compound defined by the following general formula (III) in place of a portion of the compound defined by the general formula (I) and/or the compound defined by general formula (II):

wherein in the general formula (III), the reference character c denotes 0 or 1; the reference character d denotes an integer of 0 to 2; n denotes an integer of 1 to 11; Tf3 denotes a glycidyl group or $CH_2=CH—C(O)—$; and A denotes H or F.

4. The sealing composition according to claim 3, containing less than 50 parts by weight of the compound defined by the general formula (III) to 100 parts by weight of the total of the compound defined by the general formula (I), the compound defined by the general formula (II) and the compound defined by the general formula (III).

5. The sealing composition according to claim 1, having a refractive index ($n_D$) at 25° C. in a liquid state in a range from 1.34 to 1.41.

6. The sealing composition according to claim 1, having a viscosity measured at 25° C. in a range from 10 to 500 mPa·s.

7. The sealing composition according to claim 1, having a Tg in form of a cured substance in a range from 80 to 110° C.

8. A method of sealing the air holes of an optical fiber having air holes in the inside, comprising the steps of: filling the air holes in the end portion of the optical fiber having air holes in the inside with the sealing composition according to claim 1; and radiating ultraviolet rays to the filled sealing composition, wherein the optical fiber having air holes in the inside is a photonic crystal fiber.

9. The method according to claim 8, further comprising a step of carrying out thermally curing treatment.

10. A production method of an optical fiber polished in the end face and having air holes in the inside, comprising the steps of:
    filling the air holes in the end portion of the optical fiber having air holes in the inside with a sealing composition comprising
        a compound defined by the following general formula (I), a compound defined by the following general formula (II) and a photo-polymerization initiator and usable to seal air holes of an optical fiber having the air holes in the inside:

$$\text{Tf1-(O)}_a\text{—(CH}_2)_b\text{—(CF}_2)_m\text{—(CH}_2)_b\text{—(O)}_a\text{-Tf1} \quad (I)$$

$$\text{Tf2-(O)}_a\text{—(CH}_2)_b\text{—(CF}_2)_m\text{—(CH}_2)_b\text{—(O)}_a\text{-Tf2} \quad (II)$$

wherein in the formulas (I) and (II), the respective reference characters a denote identically 0 or 1; the respective reference characters b denote identically 0 or 1; m denotes an integer of 4 to 12; Tf1 denotes a glycidyl group and Tf2 denotes $CH_2=CH-C(O)-$;

radiating ultraviolet rays to the filled sealing composition; and polishing the end face after the ultraviolet radiation step.

11. The production method according to claim 10, further comprising a step of carrying out thermally curing treatment.

12. The production method according to claim 10, wherein the air holes in the end portion of the optical fiber having air holes in the inside are filled with the sealing composition within 60 seconds.

13. An optical fiber having air holes in the inside, wherein the air holes are filled with the sealing composition according to claim 1 to seal a part of each of the air holes are sealed in the longitudinal direction coincident with the axial direction of the optical fiber, and wherein the optical fiber having air holes in the inside is a photonic crystal fiber.

* * * * *